(12) United States Patent
Chatterjee et al.

(10) Patent No.: US 8,065,442 B1
(45) Date of Patent: Nov. 22, 2011

(54) HIGH PERFORMANCE JOURNALING FOR REPLICATION AND CONTINUOUS DATA PROTECTION

(75) Inventors: Paresh Chatterjee, Fremont, CA (US); Srikumar Subramanian, Fremont, CA (US); Jomy Maliakal, Newark, CA (US); Suresh Grandhi, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 425 days.

(21) Appl. No.: 12/273,996

(22) Filed: Nov. 19, 2008

Related U.S. Application Data

(60) Provisional application No. 61/003,673, filed on Nov. 19, 2007.

(51) Int. Cl.
*G06F 7/00* (2006.01)
*G06F 3/00* (2006.01)

(52) U.S. Cl. ............. 710/5; 710/52; 707/682; 707/648; 707/8; 707/201

(58) Field of Classification Search ............... 710/5, 52; 707/8, 201
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Gooddlander et al. | |
| 5,604,862 A | 2/1997 | Midgely et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,128,654 A | 10/2000 | Runaldue et al. | |
| 6,298,345 B1 * | 10/2001 | Armstrong et al. | 707/999.008 |
| 6,434,681 B1 | 8/2002 | Armangau | |
| 6,487,561 B1 | 11/2002 | Ofek et al. | |
| 6,609,187 B1 * | 8/2003 | Merrell et al. | 711/173 |
| 6,665,675 B1 * | 12/2003 | Mitaru | 707/999.01 |
| 6,671,757 B1 | 12/2003 | Mutler et al. | |
| 6,694,336 B1 | 2/2004 | Multer et al. | |
| 6,732,125 B1 * | 5/2004 | Autrey et al. | 707/999.2 |
| 7,398,422 B2 * | 7/2008 | Amano et al. | 714/19 |

(Continued)

OTHER PUBLICATIONS

Shepard, et al., SGI InfiniteStorage Shared Filesystem CXFS: A High Performance, Multi-OS Filesystemfrom SGI, White Paper, Jun. 16, 2004 (19 pages).*

(Continued)

*Primary Examiner* — Tammara Peyton
(74) *Attorney, Agent, or Firm* — McKeon, Meunier Carlin & Curfman

(57) ABSTRACT

Technologies are described herein for high-performance and space efficient journaling mechanisms. A journal queue can buffer incoming I/O operations. The queue can be read by a journal write module. The journal write module can form metadata headers to store into the journal along with each I/O operation. Compound metadata headers may be formed for multiple I/O operations and the combination of multiple I/O operations may be efficiently stored to the journal as one journal write. Multiple journal entries may be written into the journal in parallel while maintaining the sequential ordering of the journal. A queue depth threshold can be established for determining if journal entries should be combined into compound entries or not. Multiple concurrent readers can support continuous data protection, and various data replication features. Each reader can be represented as a reader pointer and a journal writer can invalidate reader pointers when related data is overwritten.

17 Claims, 7 Drawing Sheets

U.S. PATENT DOCUMENTS

| | | | |
|---|---|---|---|
| 7,415,486 | B2 | 8/2008 | Multer |
| 7,457,980 | B2 | 11/2008 | Yang et al. |
| 7,680,834 | B1 * | 3/2010 | Sim-Tang ............. 707/999.201 |
| 7,725,445 | B2 * | 5/2010 | Hirakawa et al. ............ 707/695 |
| 2002/0029227 | A1 | 3/2002 | Multer et al. |
| 2002/0040369 | A1 | 4/2002 | Multer et al. |
| 2004/0250031 | A1 | 12/2004 | Ji et al. |
| 2005/0091391 | A1 | 4/2005 | Burton et al. |
| 2005/0228957 | A1 | 10/2005 | Satoyama et al. |
| 2005/0273565 | A1 | 12/2005 | Hirakawa et al. |
| 2006/0206542 | A1 | 9/2006 | Wolfgang et al. |
| 2006/0236047 | A1 | 10/2006 | Shitomi |
| 2007/0150677 | A1 | 6/2007 | Homma et al. |
| 2008/0052480 | A1 | 2/2008 | Satoyama et al. |
| 2008/0104443 | A1 | 5/2008 | Akutsu et al. |
| 2008/0244205 | A1 | 10/2008 | Amano et al. |
| 2009/0044046 | A1 | 2/2009 | Yamasaki |
| 2009/0055608 | A1 | 2/2009 | Yamasaki |

OTHER PUBLICATIONS

Fan et al., "A Failure Recovery Mechanism for Distributed Metadata Servers in DCFS2," IEEE Computer Society, 2004.*

Intel (Publisher). "PRO/10 Adapter: Reducing Bottlenecks for Maximum Performance," 2004. URL: http://www.intel.com/support/network/adapter/pro100/sb/cs-010531.htm, 5 pages.

U.S. Official Action dated Mar. 27, 2009 in U.S. Appl. No. 11/695,673.

U.S. Official Action dated Apr. 30, 2009 in U.S. Appl. No. 11/695,854.

U.S. Official Action dated Oct. 14, 2009 in U.S. Appl. No. 11/695,854.

U.S. Appl. No. 11/695,673, filed Apr. 3, 2007, entitled "Snapshot-Assisted Data Replication," Inventors: Chatterjee et al.

U.S. Appl. No. 11/695,854, filed Apr. 3, 2007, entitled "Asynchronous Data Replication," Inventors: Chatterjee et al.

U.S. Appl. No. 12/104,129, filed Apr. 16, 2008, entitled "Low Latency Synchronous Replication Using an N-Way Router," Inventors: Chatterjee et al.

U.S. Appl. No. 12/173,188, filed Jul. 15, 2008, entitled "Continuous Data Protection Journaling in Data Storage Systems," Inventors: Chatterjee et al.

U.S. Appl. No. 12/173,203, filed Jul. 15, 2008, entitled "Data Recovery Point Review in a Continuous Data Protection System," Inventors: Chatterjee et al.

* cited by examiner

HIGH PERFORMANCE JOURNALING FOR REPLICATION AND CONTINUOUS DATA PROTECTION

CROSS-REFERENCE TO RELATED APPLICATION

This application claims the benefit of U.S. provisional patent application No. 61/003,673, filed on Nov. 19, 2007, entitled "High Performance and Space-Efficient Journaling for Continuous Data Protection and Replication," which is expressly incorporated herein by reference in its entirety.

BACKGROUND

The reliable storage of data benefits from being protected against various forms of destruction or data loss. Some of these risks are physical and tangible, such as failure of a storage drive, fire, or flood. Others are intangible or logical, such as accidental deletion of a file, or attack by a computer virus. Data storage systems have specific ways in which they protect against this second category of loss. For example, file versioning, tape backups, or periodic backup to a remote server may be used to protect against data loss. Many of these solutions are periodic, meaning that the protection is invoked weekly, once a day, or possibly even less frequently. As a result, recovered data after a failure can incur loss of data up to the amount created during the time period between two backups.

Continuous data protection (CDP) or continuous backup is increasingly used to protect data. In some CDP solutions, a copy of every change made to the stores data is automatically saved in a journal device. This essentially captures every version of the data over time. Storing data continuously with an associated time stamp in a journal device is called journaling. Journaling can provide support for users or administrators to restore data to any point in time.

Journal assisted replication (JAR) is another method used to protect data from disaster. JAR replicates input/output (I/O) operations from a journal device to a remote volume. This replication mechanism can provide an improved recovery point objective (RPO) since I/O operations in the journal may maintain write-order fidelity.

The journal device is critical to data protection technologies like CDP and JAR. One main challenge in implementing a journal device is to avoid introducing a performance penalty on the data storage system associated with using the journal device.

It is with respect to these considerations and others that the disclosure made herein is presented.

SUMMARY

Technologies are described herein for high-performance and space efficient journaling mechanisms. These mechanisms can be used for both continuous data protections and remote data replication.

According to one embodiment, a journal queue can receive incoming I/O operations to be logged into the journal. The I/O operations can be read from the queue by a journal write module. The journal write module can form metadata headers to store into the journal along with each I/O operation. Alternatively, a compound metadata header may be formed for multiple I/O operations and the combination of the compound header and the multiple I/O operations may be efficiently stored to the journal as one journal write.

According to another embodiment, the journal write module can write multiple journal entries, multiple compound journal entire, or a combination thereof into the journal in parallel. This parallel storage of I/O operation into the journal can maintain the sequential ordering of the journal entries. A queue depth threshold can be established for determining if journal entries should be combined into compound entries or not based on a possible impact on I/O latency.

According to yet another embodiment, multiple concurrent readers can be supported. For example, these readers may support continuous data protection and remote data replication. Each reader can be represented as a reader pointer with respect to a circular buffer implementation of a journal. A journal writer can invalidate reader pointers when data is written over the next read location of the read pointer.

According to yet another embodiment, snapshot events may be stored in the journal. Journal assisted replication can transition into snapshot assisted replication in response to an associated reader pointer being invalidated.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
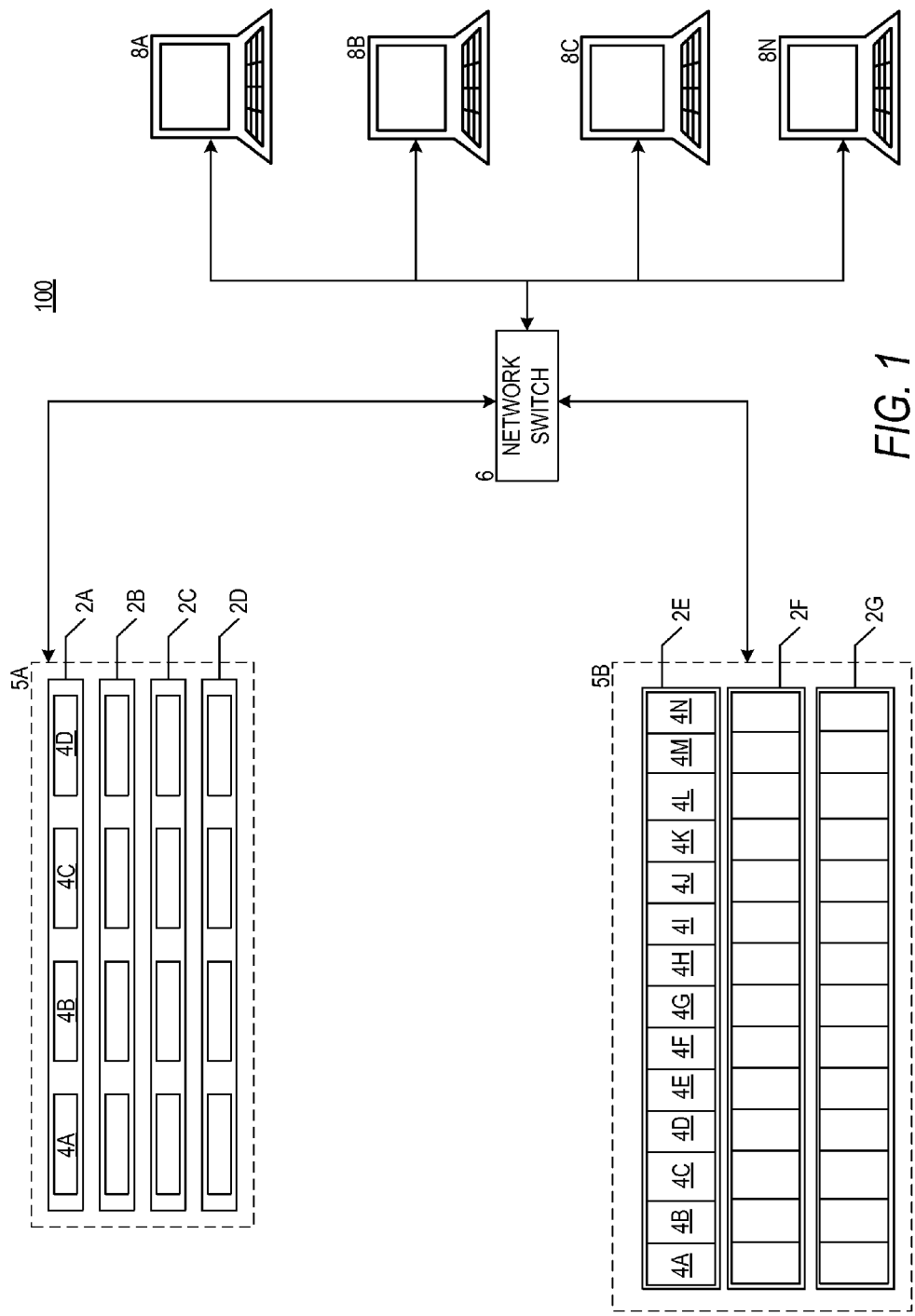
FIG. 1 is a network architecture diagram illustrating aspects of a storage system according to an embodiment presented herein.

The following detailed description is directed to technologies for high-performance and space efficient journaling in a data storage system. Through the use of the embodiments presented herein, technologies for high performance journaling within a data storage system can support data replication and continuous data protection.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for high-performance and space efficient journaling in a data storage system will be described.

Turning now to FIG. 1, details will be provided regarding an illustrative operating environment for the implementations presented herein, as well as aspects of several software components that provide the functionality described herein. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface (iSCSI) protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Modules for high-performance and space efficient journaling may be provided on one or more storage server computers 2A-2G, or one or more storage clusters 5A-5B. Furthermore, the processes for implementing high-performance and space efficient journaling may execute on any of these systems or may operate in a distributed fashion with components executing across two or more of these systems.

Figure 2:
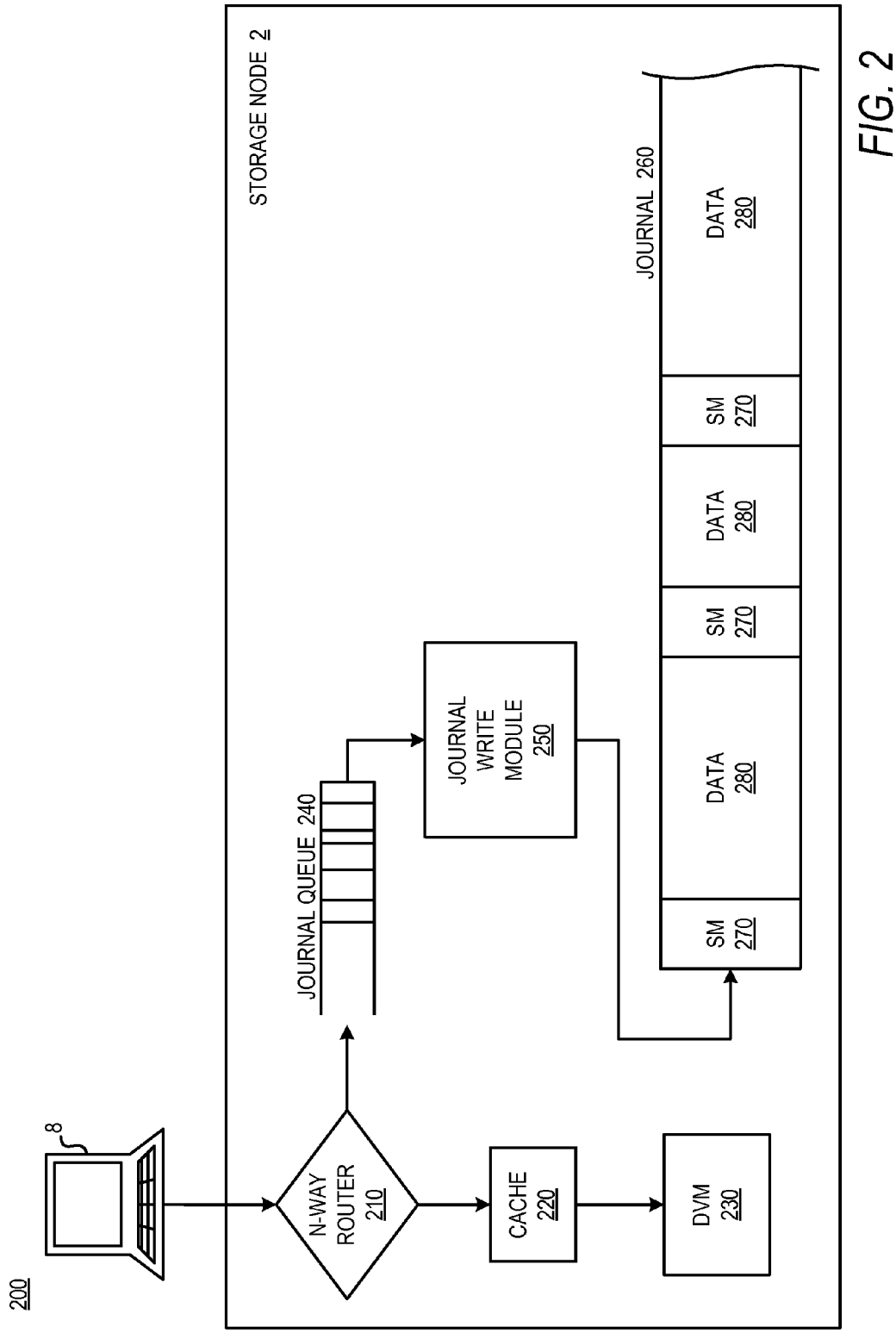
FIG. 2 is a block diagram illustrating a data storage node with a journal for sequentially logging I/O operations according to embodiments presented herein.

Referring now to FIG. 2, a block diagram 200 illustrates a data storage node 2 with a journal 260 for sequentially logging I/O operations according to an embodiment presented herein. An n-way router 210 can function as a programmable routing module for routing I/O operations from different source modules to different destination modules. This routing can be based on the programming or configuration of the n-way router 210. Examples of different sources may be an initiator 8, another node 2, or a background module that can read logged data from the journal 260. Examples of destination modules may be a data volume manager (DVM) module 230, one of various replication modules, or the journal 260.

The n-way router 210 can receive I/O operations from an initiator 8. The I/O operations may be routed to the DVM module 230 where the operations are processed to disk. I/O operations routed to the DVM module 230 may be supported by a cache 220. I/O operations can also be replicated by the n-way router 210 to the journal 260. At the journal 260, I/O operations can be sequentially logged. I/O operations to be stored in the journal 260 can be stored first into a journal queue 240. A journal write module 250 can read I/O operations from the journal queue 240 and write them sequentially to the journal 250.

When the journal write module 250 writes I/O operations to the journal 260, the appropriate metadata headers can be generated for inclusion into the journal 260 along with the I/O operation logs. A metadata header associated with a single I/O operation can be referred to as a single metadata (SM) header 270. The I/O operation stored with the SM header 270 can be referred to as the journal data 280.

Continuous data protection (CDP) can be used to protect data on a continuous basis. The I/O operations written to the journal 260 can be used to a continuous record of the state of associated storage volumes. The journal 260 may be implemented as a ring buffer structure so that a sliding window of recent storage modifications can be maintained. This record may be used to step back to previous points in storage history to recover from errors or failures. Thus, the journal 260 can support CDP functions. The journal 260 can also support journal assisted replication (JAR). JAR can use the record of I/O operation stored to the journal 260 to replicate the data to another volume or storage node 2.

Figure 3:
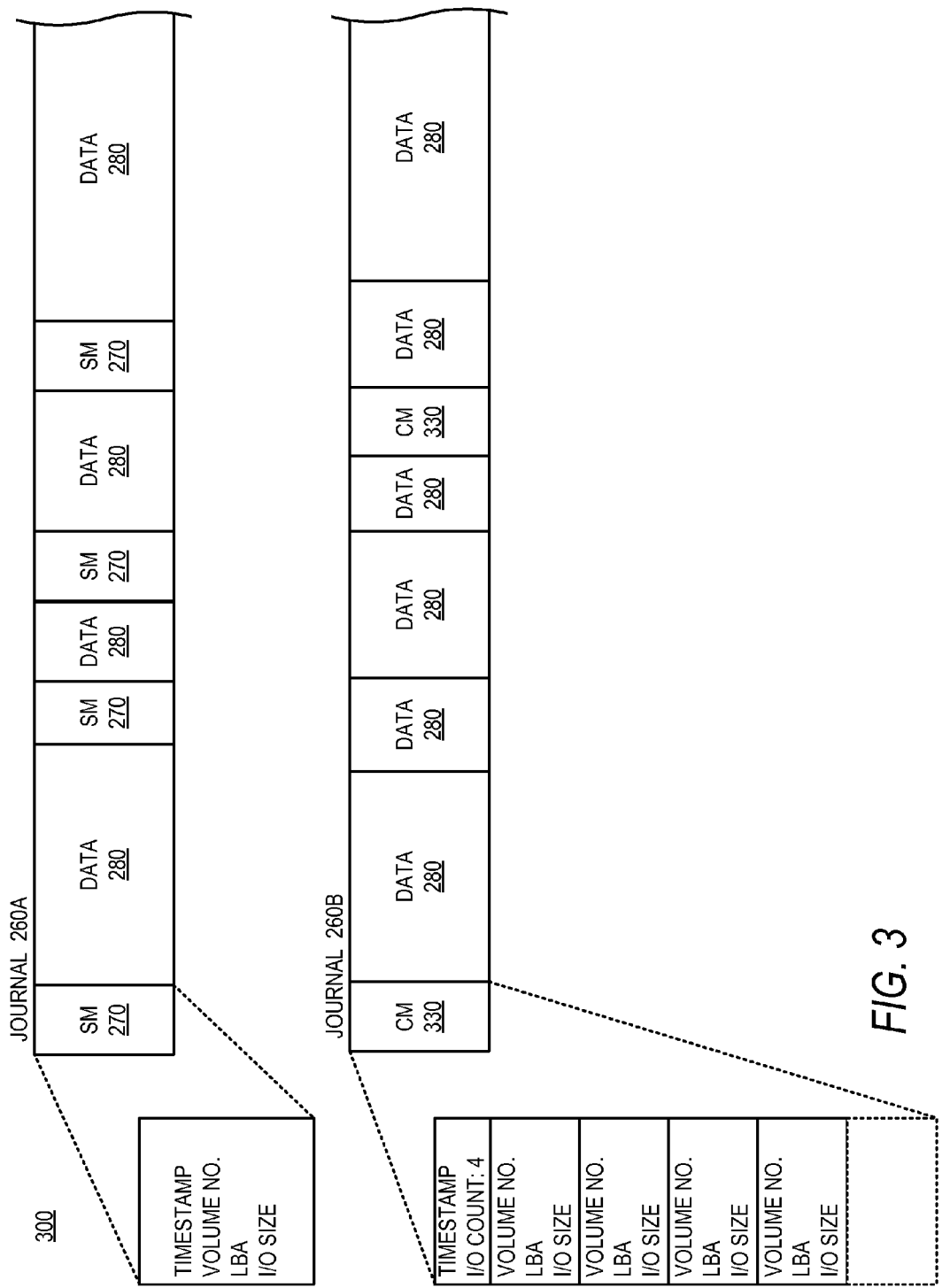
FIG. 3 is a block diagram illustrating a compound journal structure according to an embodiment presented herein.

Referring now to FIG. 3, a block diagram 300 illustrates a compound journal 260B structure according to an embodiment presented herein. Metadata headers can be generated for inclusion into the journal 260 along with the I/O operation logs. A metadata header associated with a single I/O operation can be referred to as a single metadata (SM) header 270. The I/O operation stored with the SM header 270 can be referred to as the journal data 280. The SM header 270 can include a time stamp, a volume number to which the I/O belongs, the LBA location of the I/O, and the size of the I/O. These fields are the metadata stored within the SM header 270. Other metadata may also be recorded. The SM header 270 can be written first to the journal 260A followed by actual I/O operation data 280. Unfortunately, it can become inefficient for each I/O operation to be written along with its own SM header 270 to the disk. A large number of SM headers 270 may be generated which may consume excessive storage space and may unduly increase the number of writes to the journal 260A.

A compound journal 260B can seek to process multiple I/O operations from the journal queue 240 at one time. The compound journal 260B can support metadata information for multiple I/O operations within one metadata structure which may be referred to as a compound metadata (CM) header 330. When using a compound journal 260B, the journal write module 250 can combine multiple single I/O operations into one compound journal entry to be logged to the journal 260B. In doing so, one compound write may be made to the journal 260B at one time. This can support improved performance of the journal 260B while also conserving space used for storing metadata. The CM header 330 can have a single entry for a time stamp, and a single entry for the number of I/O operations stored within the compound journal entry. The CM header 330 may also contain a list of entries, one for each I/O operation represented in the compound I/O. Each of these entries can contain a volume number, an LBA, and an I/O size. In the example illustrated, there are four I/O operations combined into one compound I/O. As such, the journal 260B starts with the CM header 330 which has four entries inside the header. The CM header 330 is then followed by four sets of journal data 280 without any additional headers or metadata required between each element of journal data 280.

In one implementation, the compound journal entry may be limited to forty single I/O operations and the total size of the compound I/O may be limited to 64 KB. If the compound I/O maximum size were too large, I/O operations might be delayed while enough I/O operations were collected in the journal queue 240 to form the larger compound journal entry.

Figure 4:
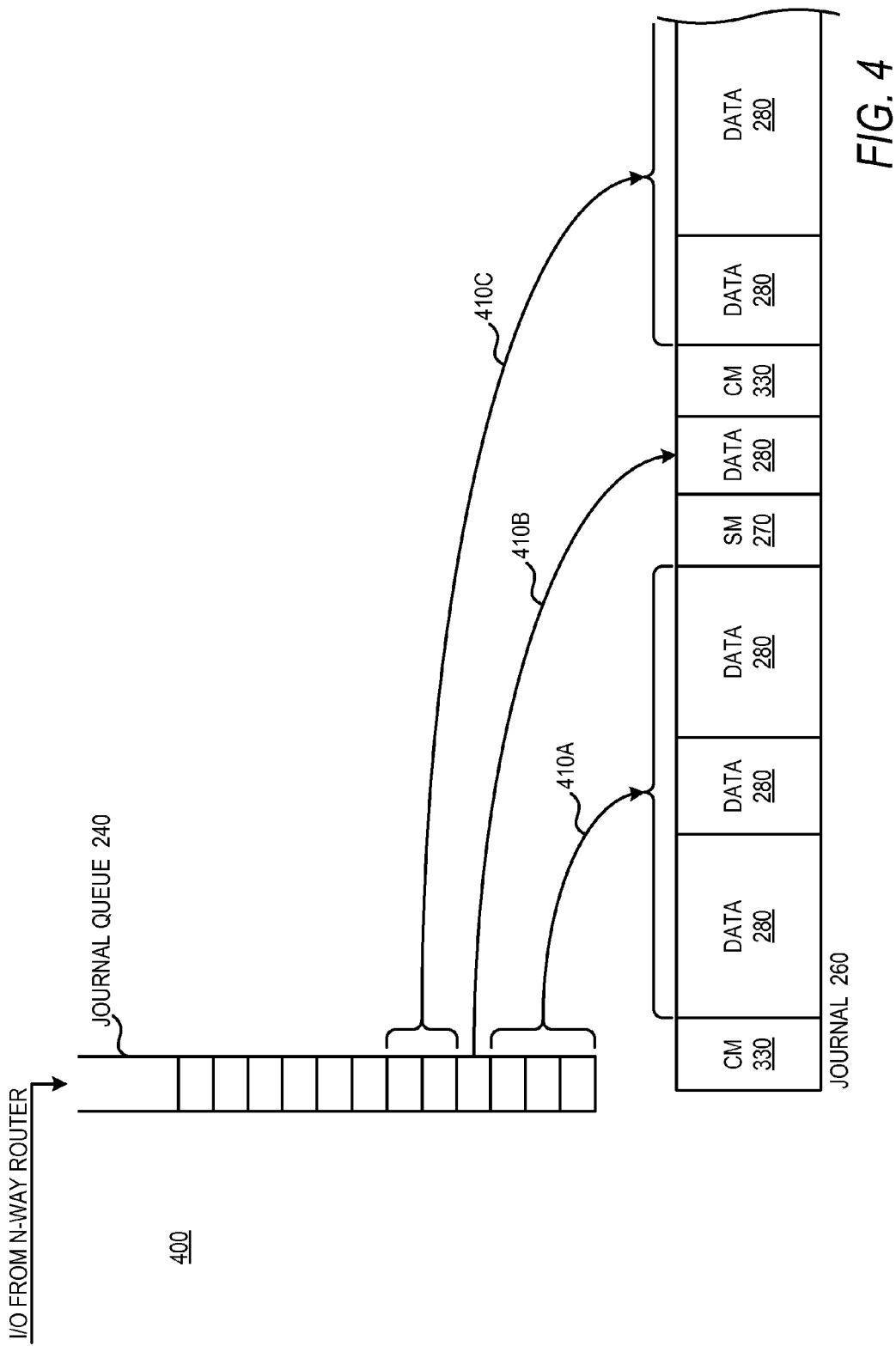
FIG. 4 is a block diagram illustrating the parallel formation of compound journal entries according to an embodiment presented herein.

Referring now to FIG. 4, a block diagram 400 illustrates the parallel formation of compound journal entries according to an embodiment presented herein. In addition to creating compound journal entries, the journal write module 250 can also form multiple compound journal entries in parallel. When the data storage system is under a heavier load, I/O operations can arrive continuously to the journal write module 250. To handle this continuous stream of I/O operations, the journal write module 250 can form multiple compound journal entries in parallel. The journal write module 250 can makes multiple compound journal writes into the journal 260 without compromising the chronological order of the journal 260. For example, a write operation 410A, as illustrated, can write three I/O operations sharing a single CM header 330 into the journal 260 as a single compound journal entry write. The write operation 410B, as illustrated, can write a single I/O operation and its SM header 270 into the journal 260, and the write operation 410C, as illustrated, can write two I/O operations sharing a single CM header 330 into the journal 260 as a single compound journal entry write. The three journal write operations 410A, 410B, 410C may be performed in parallel.

In the event of slowly, or non-continuously, arriving I/O operations, queuing I/O operations to form compound journal entries may increase I/O latency. This may occur because the I/O may not be acknowledged back to the initiator 8 until both the actual write and the journal write are both completed. To avoid the possible increased latency, the journal write module 250 can implement a policy for when to create a compound journal entry. It should be noted that a compound journal entries need not be of the maximum size. A compound journal entry may be a partially filled with whatever I/O operations exists in the journal queue 240 at the time of flushing the entries to the journal 260. An example policy for when to form compound journal entries may involve specifying a threshold size of entries waiting in the journal queue 240. For example 16 entries may be selected as the threshold according to one embodiment. When the number of I/O operations pending in the journal queue 240 exceeds the threshold, the journal write module 250 can attempt to fully form compound journal entries. However, when the number of I/O operations pending in the journal queue 240 is below the threshold, the journal write module 250 can attempt to make single journal entries or partial compound journal entries. This can avoid holding up the journal queue 240 while collecting I/O operations to place together into full compound journal entries. For example, if the outstanding journal writes are less than 16 according to one embodiment, then single or partial compound journal entries may be formed and written to the journal 260. When the outstanding journal writes are more than or equal to 16, further journal writes may be performed as full, or nearly full, compound journal entries.

The threshold number of journal queue 240 entries may be related to the maximum number of journal entries that can be formed in parallel. For example, if 16 journal entries can be formed and stored in parallel, then the threshold quantity may be set to 16. Alternatively, the threshold quantity may be a value close to, or related to, the parallel path number. The threshold quantity may also be any other number according to embodiments.

Figure 5:
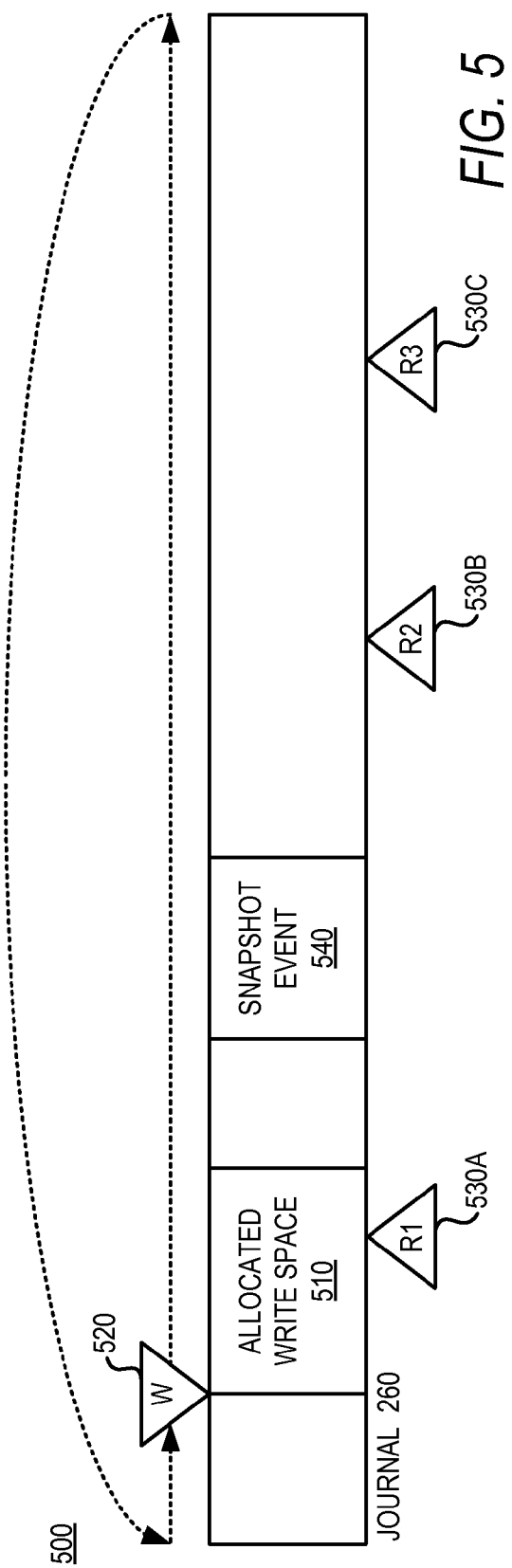
FIG. 5 is block diagram illustrating read and write pointers with respect to a journal implemented as a circular buffer according to an embodiment presented herein.

Referring now to FIG. 5, a block diagram 500 illustrates read and write pointers with respect to a journal 260 implemented as a circular buffer according to an embodiment presented herein. CDP and replication modules may read from a journal 260 to obtain their input I/O stream. It should be noted that journaling and replication can happen concurrently in a system. As such, there may be multiple readers reading from the journal 260 at the same time as the journal 260 is being written to. The journal writer and journal readers can work in conjunction to maintain data integrity with respect to the journal 260. A general resource lock for the journal 260 could be employed. However, the journal writer may be stalled while a reader has the lock. A stall at the writer may introduce increased latency in I/O operations being acknowledged back to the initiator 8. Instead, a lightweight lock may be supported.

Reader pointers, such as R1 530A, R2 530B, and R3 530C, may be referred to collectively, or in general, as reader pointers 530. A reader pointer 530 may be provided for each reader of the journal 260. These readers may include a CDP module, a module for replication to a second node 2, a module for replication to a third node 2, and so on. Similarly, a writer pointer 520 may be provided for the journal write module 250. The writer pointer 520 and the reader pointers 530 can contain an address, or LBA, of the next location in the journal 260 to be read from or written to. As I/O operations arrive at the journal 260, entries can be written and the writer pointer 520 can be moved forward. Journal readers read data from the journal 260. The readers can use the data for replication or CDP. A reader pointer 530 may not be allowed to pass the writer pointer 520. Since the journal 260 may be a circular buffer, the writer may continue writing to the journal 260 around and around in a circular fashion. If the writer comes to the end of journal 260, the writer pointer 520 can circle back to restart from the beginning of the journal 260.

A lock and invalidation technique can be used to prevent the looping back of the writer pointer 520 from passing a reader 530 and corrupting data that is yet to be read. Before writing, the writer can briefly acquire a lightweight lock to determine if reader pointers 530 exist within the currently allocated write space 520. If a reader is in this space, the reader can be designated as invalid. This can indicate to the reader that it cannot read from its location since the writer has already overwritten the data. Similarly, before performing a read, a reader can verify that the associated reader pointer 530 is valid. If the reader pointer 530 is valid, the read from the journal 260 can be performed. After the read is performed, the reader can acquire the lock and again check that the reader pointer 530 is still valid. If the reader pointer 530 is invalid, the writer has written over the data while the reader was reading data. Since these locks on the reader pointer 530 are lightweight and can be acquired and released momentarily, there may be no concern for blocking or stalling of the writer. The writer may continuously free flow over the journal 260 whenever it receives I/O operations in the journal queue 240.

When a reader pointer 530 has been invalidated, the reader can switch from making journal reads, to making snapshot reads. For example, if read pointer R1 530A is invalidated by the granting of allocated write space 510, reading the stored data may still be possible from a snapshot. The next journal entry associated with a snapshot event 540 may be identified to provide data for the invalidated reader. For example, when a reader pointer 530A associated with journal assisted replication has been invalidated, the JAR replication can switch over to a snapshot assisted replication (SAR) by continuing to read data from the journal 260 using the next snapshot event 540 logged within the journal 260.

Figure 6:
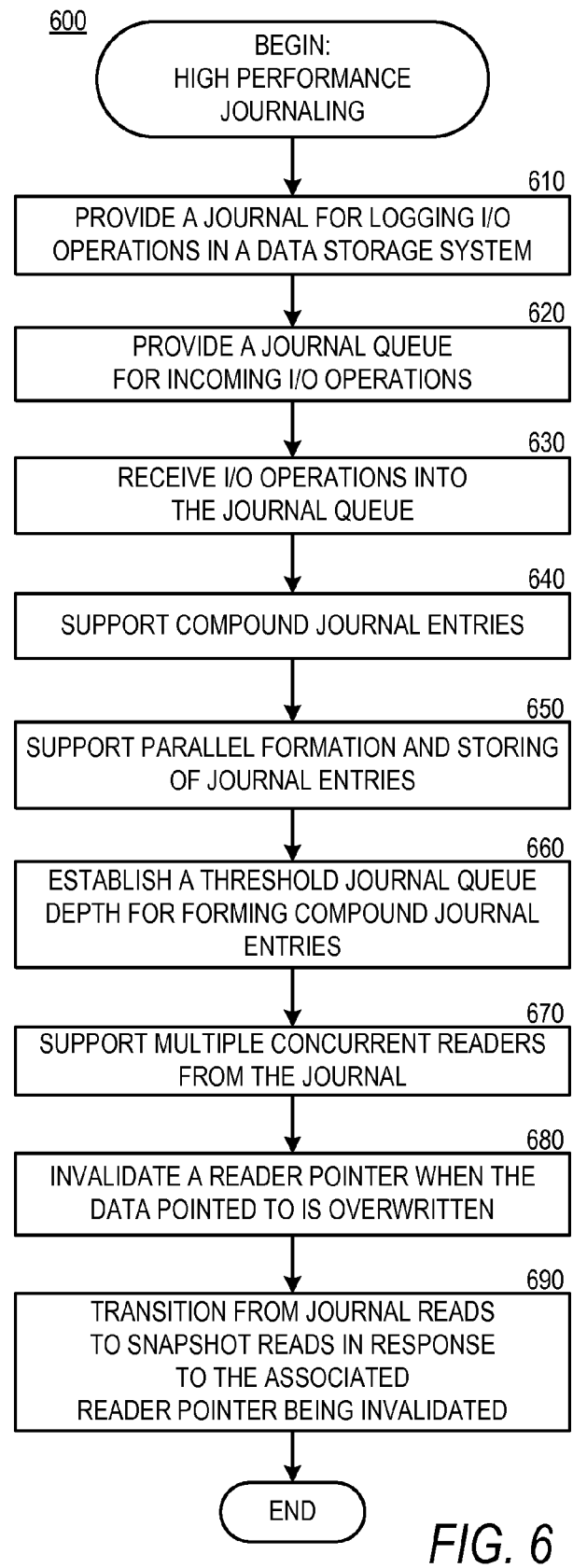
FIG. 6 is a logical flow diagram illustrating a process for high performance journaling within a data storage system according to an embodiment presented herein.

Turning now to FIG. 6, additional details will be provided regarding the embodiments presented herein for high performance journaling within a data storage system to support replication and continuous data protections. In particular, FIG. 6 is a flow diagram showing a routine 600 that illustrates aspects of a process for high performance journaling within a data storage system according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 600 can begin with operation 610 where a journal 260 is provided for logging I/O operations in a data storage system. In operation 620, a journal queue 240 is provided to buffer incoming I/O operations. In operation 630, I/O operations are received into the journal queue 240.

At operation 640, compound journal entries can be supported by forming a compound metadata header 330 covering multiple I/O operations. The compound metadata header 330 and the associated I/O operations may then be written to the journal 260 in a single journal write. At operation 650, journal entries can be formed and stored in parallel to provide improved efficiency. At operation 660, a threshold journal queue depth can be established. The threshold can be used to determine when I/O operations should be combined into compound journal entries or stored as single or partial compound journal entries. When the depth of the journal queue 240 exceeds the threshold value, journal entries can be stored as combined compound journal entries.

At operation 670, multiple concurrent reads may be supported. The readers may include a CDP module, various replication modules, and so forth. A reader pointer may be provided for each one of the multiple readers. At operation 680, a reader pointer may be invalidated when the associated data is overwritten. At operation 690, a reader can transition from journal reads to snapshot reads in response to the associated reader pointer being invalidated. For example, a JAR operation may transition to a SAR operation by identifying the next snapshot in the journal 260 and using data from the snapshot in place of the overwritten journal data. The routine 600 can terminate after operation 690.

Figure 7:
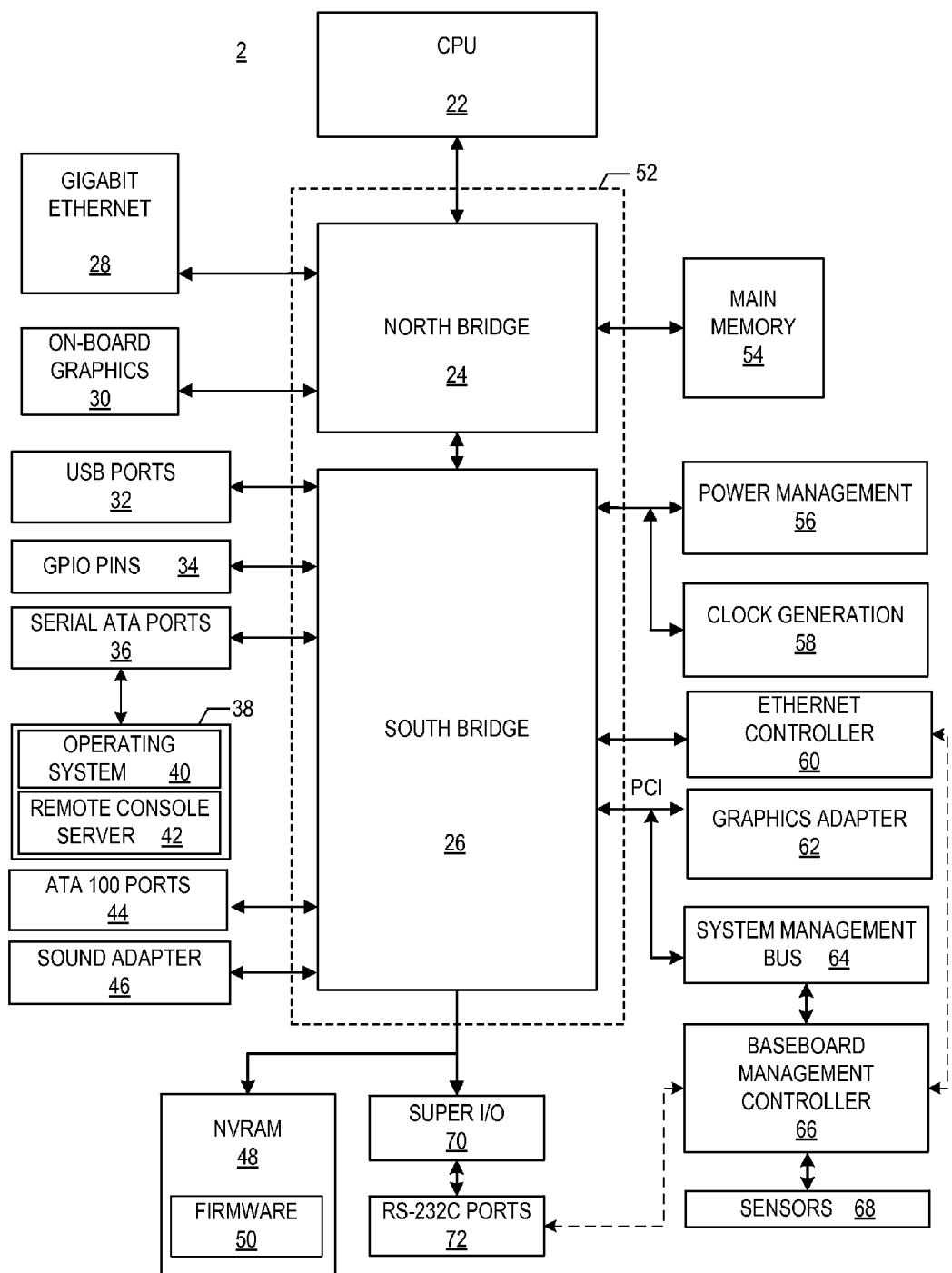
FIG. 7 is a computer architecture diagram illustrating a computer hardware architecture for a computing system capable of high-performance and space efficient journaling within a data storage system according to an embodiment presented herein.

FIG. 7 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 7 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory (RAM) used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus (USB) ports 32, a sound adapter 46, an Ethernet controller 60, and one or more general purpose input/output (GPIO) pins 34. The south bridge 26 may also provide a bus for interfacing peripheral card devices such as a graphics adapter 62. In one embodiment, the bus comprises a peripheral component interconnect (PCI) bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment (SATA) adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 7, may include other components that are not explicitly shown in FIG. 7, or may utilize an architecture completely different than that shown in FIG. 7.

Based on the foregoing, it should be appreciated that technologies for high performance journaling within a data storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for journaling within a data storage system, the method comprising:
    receiving an I/O operation;
    queuing the received I/O operation in a journal queue;
    supporting combining multiple I/O operations into a compound journal entry;
    forming a compound metadata entry associated with each of the multiple I/O operation within the compound journal entry;
    supporting a concurrent parallel write of multiple journal entries; and
    establishing a threshold journal queue depth, and forming compound journal entries in response to a depth of the journal queue exceeding the threshold journal queue depth.

2. The method of claim 1, further comprising supporting multiple concurrent journal readers.

3. The method of claim 1, further comprising invalidating a reader pointer in response to overwriting the associated journal data.

4. The method of claim 3, wherein invalidating a reader pointer comprises applying a lightweight lock to the reader pointer.

5. The method of claim 3, further comprising transitioning a reader from journal assisted reads to snapshot assisted reads in response to the reader pointer being invalidated.

6. The method of claim 1, further comprising establishing a threshold journal queue depth, and forming single journal entries in response to a depth of the journal queue being below the threshold journal queue depth.

7. A computer storage medium having computer-executable instructions stored thereon which, when executed by a computer system, cause the computer system to:
    receive an I/O operation;
    queue the received I/O operation in a journal queue;
    support combining multiple I/O operations into a compound journal entry;
    form a compound metadata entry associated with each of the multiple I/O operation within the compound journal entry;
    support a concurrent parallel write of multiple journal entries; and
    establish a threshold journal queue depth, and forming compound journal entries in response to a depth of the journal queue exceeding the threshold journal queue depth.

8. The computer storage medium of claim 7, further comprising causing the computer system to support multiple concurrent journal readers.

9. The computer storage medium of claim 7, further comprising causing the computer system to invalidate a reader pointer in response to overwriting the associated journal data.

10. The computer storage medium of claim 9, wherein invalidating a reader pointer comprises applying a lightweight lock to the reader pointer.

11. The computer storage medium of claim 9, further comprising causing the computer system to transition a reader from journal assisted reads to snapshot assisted reads in response to the reader pointer being invalidated.

12. The computer storage medium of claim 7, further comprising causing the computer system to establish a threshold journal queue depth, and forming single journal entries in response to a depth of the journal queue being below the threshold journal queue depth.

13. A data storage system comprising:
    a storage server;
    a physical storage device associated with the storage server;
    a processing unit associated with the storage server;
    and one or more modules for execution on the processing unit, operable to receive an I/O operation, queue the received I/O operation in a journal queue, support combining multiple I/O operations into a compound journal entry, form a compound metadata entry associated with each of the multiple I/O operation within the compound journal entry, and support a concurrent parallel write of multiple journal entries,
    wherein the one or more modules for execution on the processing unit are further operable to establish a threshold journal queue depth, and forming compound journal entries in response to a depth of the journal queue exceeding the threshold journal queue depth.

14. The data storage system of claim 13, wherein the one or more modules for execution on the processing unit are further operable to support multiple concurrent journal readers.

15. The data storage system of claim 13, wherein the one or more modules for execution on the processing unit are further operable to invalidate a reader pointer in response to overwriting the associated journal data.

16. The data storage system of claim 15, wherein invalidating a reader pointer comprises applying a lightweight lock to the reader pointer.

17. The data storage system of claim 15, wherein the one or more modules for execution on the processing unit are further operable to transition a reader from journal assisted reads to snapshot assisted reads in response to the reader pointer being invalidated.

* * * * *